Nov. 20, 1934.   C. B. DE VLIEG   1,981,224
AUTOMATIC POSITIONING MECHANISM
Filed Dec. 16, 1932   2 Sheets—Sheet 1

Inventors:
Charles B. DeVlieg
By Wilson, Dawell,
McCanna & Wintercorn
Attys.

Nov. 20, 1934.  C. B. DE VLIEG  1,981,224
AUTOMATIC POSITIONING MECHANISM
Filed Dec. 16, 1932   2 Sheets-Sheet 2
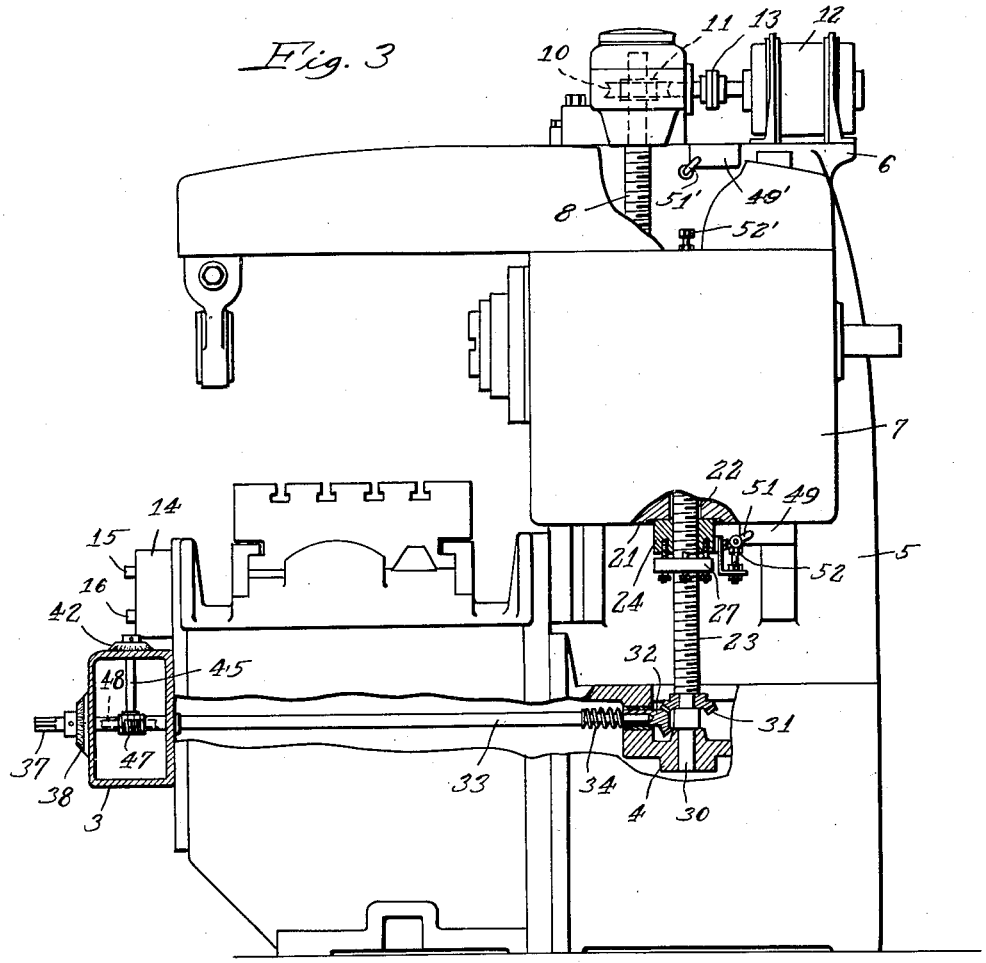
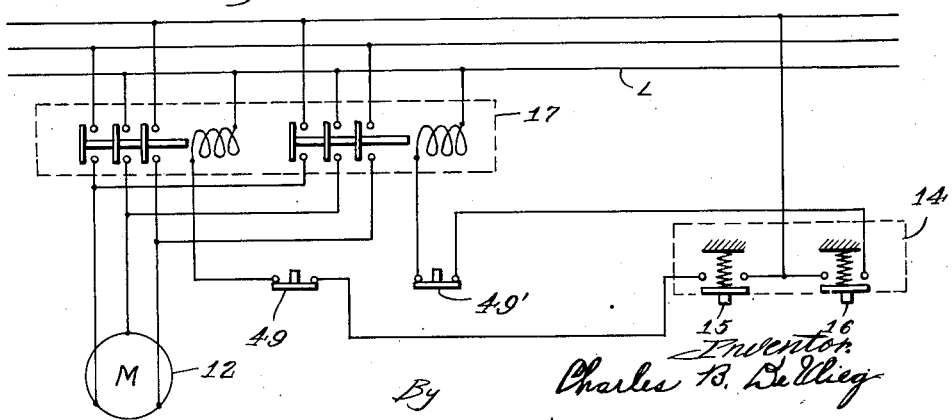

Patented Nov. 20, 1934

1,981,224

UNITED STATES PATENT OFFICE 1,981,224

AUTOMATIC POSITIONING MECHANISM

Charles B. De Vlieg, Jackson, Mich., assignor to Associated Patents, Inc., Cincinnati, Ohio, a corporation of Ohio Application December 16, 1932, Serial No. 647,663

35 Claims. (Cl. 90—16)

This invention relates to automatic positioning mechanisms generally and has particular reference to one adapted for precision location of any machine tool carriage or slide, whether it be in metal working or wood working, although the principal uses are in metal working. It is further immaterial whether the carriage or slide to be positioned is a work carriage or a tool carriage, for obvious reasons. Among the kinds of machines finding use for automatic positioning mechanisms like the one of my invention may be mentioned milling machines, drilling machines, lathes, boring and tapping machines, planers and shapers, etc.

Electric controls have been provided to more or less accurately position machine tool elements but so far as I am aware they have been impractical, because of the time consumed by the operator in making the set-up and also because of the amount of skill required on the part of the operator in reading vernier scales, and setting stops to such precision as to require the use of a magnifying glass. Furthermore, such controls were unsuited to machines of large dimensions because of the length of vernier scales required and the fact that the operator had to climb over the work from one end of the machine to the other to set stops, and then get back to the operator's position to throw the positioning mechanism into operation.

It is, therefore, the principal object of my invention to provide an automatic positioning mechanism in which the setting of a stop to accurately position the machine tool element can be accomplished entirely from the operator's position by simply turning a part, which moves the stop and is connected with a direct reading scale so as to show the setting to within .00025 inch, so that the mechanism can be thrown into operation after the setting to complete the positioning, without the operator having had to leave his position at any time.

Another object of my invention is to utilize an electric motor to operate the propelling screw for moving the machine tool element, and a limit switch operated by engaging an abutment on the stop mentioned above, so as to break the motor circuit when the machine tool element is a predetermined distance from the stop, close enough for the overrun of the motor to take care of such slight additional turning of the propelling screw as will be required to bring the machine tool element firmly into engagement with the stop. In that way, the machine tool element is not only accurately positioned but also locked in position. The abutment on the stop for engagement by the limit switch is afforded by an adjustable set screw so that the proper allowance can be made for more or less overrun of the motor.

The invention is illustrated in the accompanying drawings, in which—

Fig. 3 is an end view of a horizontal milling machine with certain parts broken away so as to better illustrate the embodiment of my improved automatic positioning mechanism thereon, and Fig. 4 is a wiring diagram.

Figure 1:
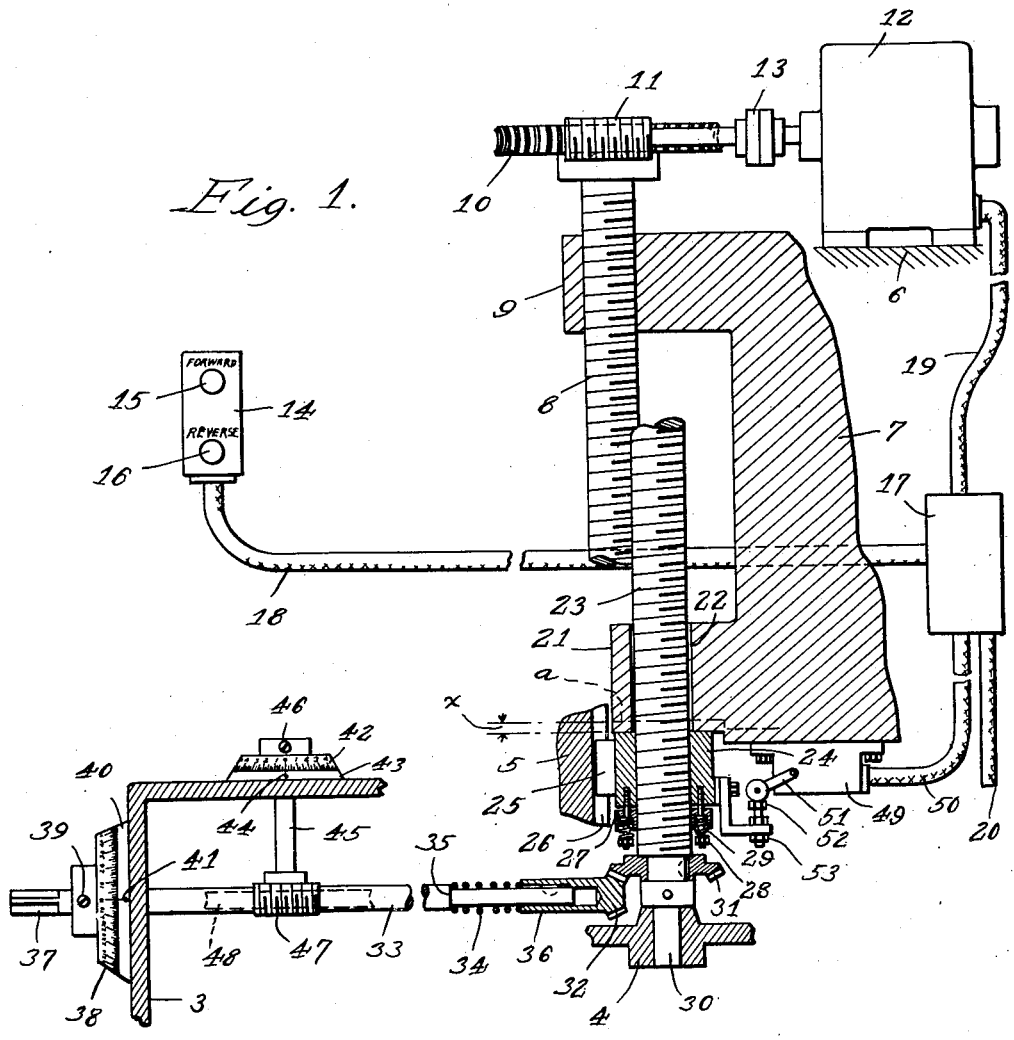
Figure 1 is a schematic drawing of an automatic positioning mechanism made in accordance with my invention.

Referring to Figures 1 and 3, I have illustrated the embodiment of my invention in a horizontal milling machine in which the part 3 is a housing mounted on the front of the machine, 4 is a bearing in the column 5 at the back of the machine, and 6 is a motor support on top of the column. The part to be positioned automatically is, in this instance, the adjustable head 7 slidable vertically on ways on the column, as shown, and supporting the usual driven tool spindle. However, it is immaterial, generally speaking, whether the movable part be the tool carriage or work carriage on any machine tool, and it is further immaterial in what direction the part is arranged to move. 8 is the propelling screw threading in a boss 9 on the sliding head 7, the same being suitably supported against endwise movement so as to transmit vertical movement to the head when the screw is turned. A worm gear 10 on the upper end of the screw has a worm 11 meshing with it and driven by the electric motor 12 through a suitable coupling 13. The motor 12 is of any suitable reversible type and is carried on the support 6. 14 is a control panel preferably mounted on the front of the machine at the operator's position and having two buttons 15 and 16 for forward and reverse operation of the motor through the instrumentality of well known relays in a switch box 17 with which the panel 14 and motor 12 have connection through conduits indicated at 18 and 19 in Figure 1. The conduit indicated at 20 is for connection with the three-phase line L indicated in Fig. 4.

Another boss 21 is provided on the head 7 which has an opening 22 therein to freely receive a screw 23 for adjusting the positive stop shown at 24. The latter is simply in the form of a nut threaded on the screw and held against turning by means of a tongue 25 slidable in a vertical groove 26 provided in the column 5. A secondary nut 27 threaded on the screw 23 below the stop 24 has a plurality of cap screws 28 passed through holes therein and threaded in the stop 24, and coiled compression springs 29 are compressed between the heads of these screws and the nut 27 as a means of removing back lash from the stop 24, for purposes of accuracy in setting. The screw 23 has a reduced shank 30 at the lower end thereof for bearing and end thrust support on the frame of the machine at 4. There is, of course, another bearing at the other end of the screw to hold the same against endwise movement, for obvious reasons. A bevel gear 31 keyed on the screw at the lower end has a bevel pinion 32 meshed with it and arranged to be turned by means of a shaft 33, rotated manually, as will be brought out presently. The pinion 32 is splined on the end of the shaft 33 and a coiled compression spring 34 acts between an annular shoulder 35 on the shaft and the end of the hub 36 of the pinion for the purpose of removing back lash in the gear connection between the shaft 33 and screw 23. Now, the shaft 33 has a square shank 37 projecting from the frame of the machine at 3 to permit application of a hand crank thereto for manually rotating the shaft and the screw 23 with it, so as to adjust the stop 24. A dial 38 fixed on the projecting end of the shaft as by means of a set screw 39 turns relative to the plate 40 fixed on the frame. An index mark 41 on the plate permits one to make a reading on the dial to show the extent of adjustment. The pitch of the screw 23 and the ratio of the gears 31—32 are such that one turn of the shaft 33 is equivalent to .250 inch adjustment of the stop 24. It is obvious, therefore, that in order that the operator may have a direct reading in inches and fractions thereof down to .001 inch, it is necessary that a second dial be provided as that shown at 42, the dial 42 for a reading of inches and the dial 38 for fractions. The dial 42 turns with respect to the plate 43 on which the index mark 44 is provided. A shaft 45 has the dial 42 suitably fixed thereto by means of a set screw 46. The shaft 45 is turned by the meshing of a worm 47 on the shaft 33 with a worm gear 48 fixed on the shaft 45. The reduction afforded at 47—48 is 4 to 1, so that four turns of the shaft 33 are equivalent to one turn of the shaft 45, thus maintaining the proper relationship between the dials 38 and 42.

A limit switch 49 has connection through conduit 50 with the switch box 17, previously referred to, so that it is adapted to break the motor circuit to stop forward movement, that is, it automatically interrupts the circuit established by depression of the button 15 (Fig. 4). The switch 49 is so constructed that when the movable arm 51 of the switch is moved in a clockwise direction by engagement with the abutment 52 in the downward movement of the head 7, the circuit for the motor 12 will be opened. Attention is called to the dotted line position $a$, indicated for the head 7, in Figure 1, slightly above the full line position in which the head is shown. The distance $x$, between the dotted line position and the full line position, is the amount of movement of the head 7 due to overrun of the motor 12 from the moment the circuit therefor is broken by the limit switch arm 51 coming in contact with and being moved by the abutment 52. There is a sufficient allowance in this distance so that all of the overrun is not required to bring the head 7 down into firm engagement with the stop 24, but a portion of the momentum will be spent in securely locking the head in its stopped position by the binding of the propelling screw 8 in the boss 9. The abutment 52 on the stop 24 is in the form of a set screw arranged to be adjusted in accordance with the overrun of the motor, and lock nuts 53 are provided to fasten the screw in adjusted position. Obviously, if the motor has little overrun, the screw 52 should be lowered so as to allow for a smaller dimension at $x$, and vice versa. A similar switch 49' may be provided, as shown in Fig. 3, for limiting upward movement, namely, as a safety stop for preventing the head from going beyond its proper limit, in case the operator happens to keep the button 16 pressed in too long. The movable arm 51' in this instance cooperates with a screw 52' on the head.

In operation, assuming that the operator desires to position the head 7 accurately a certain distance below the present position, he, first of all, makes a note of the reading of the dials 38 and 42 so as to permit him to reset the stop 24 accurately in the new position. He can, of course, reset the dials to zero before turning the shaft 33 so as to permit him to read directly on the dials the distance to which the stop 24 is adjusted. Having set the stop the exact distance away from its former position, in accordance with the new position desired for the head, the operator then simply presses the button 15 to cause the head 7 to be moved downwardly under the power of the motor 12 driving the screw 8, until the limit switch 49 breaks the motor circuit. When that occurs the over-run of the motor assures sufficient additional movement of the head 7 to bring it into firm engagement with the stop 24, so that it is accurately positioned. The over-run is, furthermore, responsible for positive locking of the head by means of its propelling screw 8.

On the other hand, if the head 7 is to be reset to a certain position above the present position, it is manifest that the order of operations is different. In that case, the operator first has to back the head 7 away from the stop 24 and this he does by depressing the button 16. It is in this operation that it is desirable to have a limit switch 49' to prevent movement of the head upwardly beyond a certain position. The operator having backed the head away from the stop can now reset the stop to a new position, a predetermined distance above the present one, in accordance with whatever new position is desired for the head. With the stop accurately reset, the operator then presses the button 15 to return the head 7, and the motor circuit is interrupted, as stated before, by the limit switch 49, the over-run of the motor being relied upon to bring the head 7 into firm engagement with the stop and to lock the head by means of its propelling screw 8.

The operations above described are believed to be easily understandable, especially in the light of the diagram of Fig. 4. In this figure I have indicated springs behind the buttons 15 and 16 so as to make it evident that these switches depend upon finger pressure to keep the motor 12 running until the motor circuit is interrupted by the switch 49 of 49'.

Figure 2:
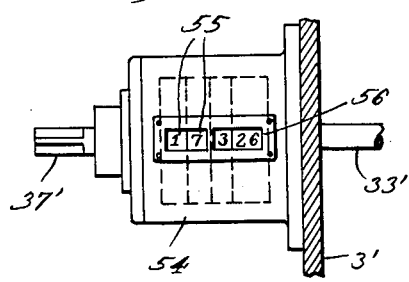
Fig. 2 is a fragmentary view of a modified form of direct reading scale suitable for use with said mechanism.

In Fig. 2, there is illustrated a modification of the direct reading scale means of Figure 1. In this form, the shaft 33', arranged to be turned by means of a hand crank applied to the square shank 37', has connection with the mechanism inside a casing 54 fixed on the frame of the machine at 3', to intermittently advance the dials 55 on which numbers appear in the window 56 provided on the casing 54. The unit is, in other words, constructed after the manner of a speedometer, the same indicating inches and fractions thereof, whereas the speedometer indicates miles and tenths of miles. With this form of direct reading scale the operator simply jots down the reading appearing in the window 56 when he is about to reset the stop 24 for a new position of the head, and working from that figure as a basis it should be apparent from the description above how the head may be brought accurately to a new position above or below an initial position.

It is believed the foregoing description conveys a good understanding of the objects and advantages of my invention. The appended claims have been drawn to cover all legitimate modifications and adaptations.

I claim:

1. Automatic positioning mechanism comprising, in combination with a movable machine tool element, a propelling screw therefor threading in a part rigid therewith, a motor for driving the screw in either direction, another screw parallel with the propelling screw and disposed so that a portion of the machine tool element is movable endwise relative thereto, a stop nut threaded on the second screw and held against turning so as to travel along the screw when the same is turned, said nut being disposed for engagement by the last mentioned portion of the machine tool element, manually operable means to turn said screw, means combined therewith to indicate directly in the operation thereof the extent of movement given said nut, a limit switch for opening the motor circuit, said switch being movable with said machine tool element and having a movable operating arm extending therefrom, and an abutment for engagement by said arm movable with said stop nut in the adjustment thereof.

2. A mechanism as set forth in claim 1, wherein said abutment is adjustable relative to said stop nut to advance or retard the operation of the limit switch for opening the motor circuit.

3. A mechanism as set forth in claim 1, wherein the abutment is so disposed relative to said stop nut to operate the limit switch when the machine tool element reaches a position in a predetermined spaced relation to the stop nut, whereby to utilize the overrun of the motor to move the machine tool element the remaining distance into engagement with said stop nut.

4. A mechanism as set forth in claim 1, wherein the abutment is so disposed relative to said stop nut to operate the limit switch when the machine tool element reaches a position in a predetermined spaced relation to the stop nut, whereby to allow the motor to move the machine tool element into engagement with the stop nut without application of power, by overrun of the motor, sufficient force being thus applied by the motor to the propelling screw to lock the machine tool element by jamming of the screw.

5. A mechanism as set forth in claim 1, wherein the manually operable means for turning said screw comprises a shaft and intermeshed bevel gears for inter-connecting the shaft and screw, the mechanism including spring means for holding the gears in close contact to eliminate back lash, whereby the means for indicating the extent of movement will record accurately the movement communicated to the stop nut in a given operation of the manually operable means.

6. A mechanism as set forth in claim 1, including a secondary nut threading on the second screw behind the stop nut and spaced therefrom but caused to turn therewith, and spring means tending to move the nuts axially in opposite directions whereby to eliminate back lash and thereby insure a predetermined movement of the stop nut in a predetermined operation of the manually operable means.

7. Automatic positioning mechanism comprising, in combination with a movable machine tool element, a screw disposed parallel to the direction of movement of said element, a stop for predetermining by its position a selected position of the machine tool element, said stop comprising a nut threaded on said screw and held against turning so as to travel along the screw when the latter is turned, manually operable means for turning said screw, and means combined therewith to indicate directly in the operation thereof the extent of movement given said nut.

8. A mechanism as set forth in claim 7, wherein the manually operable means for turning said screw comprises a shaft and intermeshed bevel gears for inter-connecting the shaft and screw, the mechanism including spring means for holding the gears in close contact to eliminate back lash, whereby the means for indicating the extent of movement will record accurately the movement communicated to the stop nut in a given operation of the manually operable means.

9. A mechanism as set forth in claim 7, including a secondary nut threading on the screw behind the stop nut and spaced therefrom but caused to turn therewith, and spring means tending to move the nuts axially in opposite directions whereby to eliminate back lash and thereby insure a predetermined movement of the stop nut in a predetermined operation of the manually operable means.

10. Automatic positioning mechanism comprising, in combination with a movable machine tool element, a propelling screw therefor threading in a part rigid therewith, an electric motor for driving the screw, an adjustable stop disposed for engagement by a portion of the machine tool element at the limit of a selected movement of said element predetermined by the setting of said stop, a limit switch for opening the motor circuit, said switch being movable with said machine tool element and having a movable operating arm extending therefrom, and an abutment for engagement by said arm movable with said stop in the adjustment thereof.

11. A mechanism as set forth in claim 10, wherein said abutment is adjustable relative to said stop nut to advance or retard the operation of the limit switch for opening the motor circuit.

12. A mechanism as set forth in claim 10, wherein the abutment is so disposed relative to said stop nut to operate the limit switch when the machine tool element reaches a position in a predetermined spaced relation to the stop nut, whereby to utilize the overrun of the motor to move the machine tool element the remaining distance into engagement with said stop nut.

13. A mechanism as set forth in claim 10, wherein the abutment is so disposed relative to said stop nut to operate the limit switch when the machine tool element reaches a position in a predetermined spaced relation to the stop nut, whereby to allow the motor to move the machine tool element into engagement with the stop nut without application of power, by overrun of the motor, sufficient force being thus applied by the motor to the propelling screw to lock the machine tool element by jamming of the screw.

14. In a mechanism of the class described, the combination with a machine tool element to be accurately positioned and locked automatically, of a propelling screw therefor threading in a part rigid therewith, an electric motor for driving said screw, an adjustable stop for engagement by said machine tool element to accurately position the same in a predetermined position, and means for automatically controlling the operation of said motor so as to break the circuit therefor when the machine tool element has arrived at a predetermined spaced relation to said stop, whereby to utilize the overrun of said motor to operate the screw for the remaining movement of said element to abutment with said stop, and secure jamming of the screw on said element to lock the same in position.

15. In an automatic positioning mechanism, the combination of a movable part to be positioned, a propelling screw threaded therein to communicate movement thereto, an electric motor for driving the screw, the motor being included in an electric circuit, said part being movable into engagement with an abutment, and circuit breaker means whereby the motor circuit is broken in timed relation to the engagement of the part with the abutment, whereby to insure firm engagement therebetween with the screw tightened a predetermined extent.

16. A mechanism as set forth in claim 15 wherein the electric motor is reversible, the mechanism including two manually operable push buttons, one for forward operation of the motor to advance the movable part toward the stop, and the other for reversed operation of the motor for the reverse travel of the part, the forward operation of the motor being contingent upon the circuit breaker means set forth, and other circuit breaker means for interrupting the motor circuit in reverse operation when the movable part reaches a predetermined position.

17. A mechanism as set forth in claim 15 wherein the stop is manually adjustable in either direction, and in which the electric motor is reversible for forward and reverse movement of the movable part toward and away from the stop, the mechanism including manually operable switch means for selectively operating the motor in either direction.

18. In an automatic mechanism of the character described, the combination of a movable part to be automatically positioned, a propelling screw threading in a portion thereof to communicate movement to said part, another screw extending freely through another portion of said part in parallel relation to the first screw, a non-rotatable stop threaded on the second screw and arranged for abutment with the last mentioned portion of the movable part, an electric motor driving the first mentioned screw, manually operable means for turning the second screw to adjust the stop as desired, and means for automatically breaking the motor circuit by predetermined approach of the movable part to the stop.

19. A mechanism as set forth in claim 18 including a manually operable switch for throwing the motor into operation and for continuing its operation during the travel of the movable part toward the stop, the circuit interrupting means being so constructed and arranged to break the motor circuit when the movable part is still a predetermined distance away from the stop, whereby to utilize the over-run of the motor in the further travel of the movable part into actual engagement with the stop and also utilize the overrun of the motor in jamming of the propelling screw relative to the part to lock the latter positively in engagement with the stop.

20. In a metal working machine, the combination of a support, a slide thereon, translating means including a rotatable member for translating said slide on said support, an electric motor for rotating said rotatable member, a stop for said slide, positioning means for said stop, control means for said electric motor between said slide and said stop including a movable element and a control part therefor operable to open the motor circuit prior to coaction between said slide and said stop, and with the rotor of said motor arranged for continuing rotation of said rotatable member for causing coaction between said slide and said stop, and said stop and said rotatable member having locking connection between them whereby to lock said translating means.

21. In a metal working machine, the combination of a support, a slide thereon, a translating screw and a nut therefor forming a pair of translating members one of which is rotatable for translating said slide on said support, an electric motor for rotating said rotatable member, a stop for said slide, a threaded rod parallel with the path of said slide having threaded connection with said stop, said threaded rod and said stop forming a pair of elements one of which is a rotatable element, and means for rotating said rotatable element and arranged to cause jamming between said pair of translating members upon coaction between said slide and said stop.

22. In a metal working machine, the combination of a support, a slide thereon, a translating screw and a nut therefor forming a pair of translating members one of which is rotatable for translating said slide on said support, an electric motor for rotating said rotatable member, a stop for said slide, a threaded rod parallel with the path of said slide having threaded connection with said stop, said threaded rod and said stop forming a pair of elements one of which is a rotatable element, means for rotating said rotatable element and arranged to cause jamming between said pair of translating members upon coaction between said slide and said stop, and complemental gages one of which indicates subdivision of the other operatively connected with said last named means.

23. In a metal working machine, the combination of a support, a slide thereon, translating means translating said slide on said support, including a threaded rod and a nut one of which is a rotatable member and having threaded connection between them, an electric motor for rotating said rotatable member, a stop for said slide, circuit breaking means for the motor including a movable member for controlling operation of said motor and a control member for said movable member acting between said slide and said support, a threaded rod having threaded connection with said stop, said threaded rod and said stop forming a pair of elements one of which is rotatable for positioning said stop to operate said control member prior to coaction between said slide and said stop, whereby to open the motor circuit accompanied by continued rotation of the rotor of said motor.

24. Automatic positioning mechanism comprising, in combination, with a movable machine tool element, means for communicating movement to said element including a drive motor, a screw parallel with the direction of movement of the machine tool element and disposed so that a portion of said element is movable endwise relative thereto, a nut threaded on the screw and disposed for engagement by the last mentioned portion of the machine tool element, means for causing relative rotation between the nut and screw so as to adjust the nut to a selected position, a limit switch for opening the motor circuit, and means for operating said switch including an element movable with the machine tool element and a coacting element therefor.

25. A mechanism as set forth in claim 24 wherein one of the last mentioned elements is adjustable relative to the other of said elements to accordingly determine the time of opening of the motor circuit.

26. A mechanism as set forth in claim 24 wherein one of the last mentioned elements is adjustable relative to the other element to cause the operation of the switch when the machine tool element reaches a predetermined position relative to the stop nut, whereby to utilize the overrun of the motor in the engagement of the machine tool element with the nut.

27. A mechanism as set forth in claim 24 wherein the means for causing relative rotation between the nut and screw comprises a gear train, there being means for indicating the extent of adjustment of the nut, the mechanism including spring means for urging the gears of said train into intimate meshing relation to eliminate backlash, whereby the means for indicating the extent of adjustment of the nut will record accurately the movement communicated to the nut in a given operation of the first mentioned means.

28. Automatic positioning mechanism comprising in combination with a movable machine tool element, a screw and complemental nut and an electric motor for causing rotation between the same to produce movement of the machine tool element, an electric circuit for said motor, a stop engageable by the machine tool element to position the latter, and circuit breaker means for the motor inserted in said circuit and arranged to break the circuit in a predetermined timed relation to the engagement of the machine tool element with the stop, whereby to insure firm engagement between the machine tool element and stop for accurate positioning, with the screw and complemental nut properly tightened.

29. Automatic positioning mechanism comprising in combination with a movable machine tool element, a screw and complemental nut, and an electric motor for causing rotation between the same to produce movement of said machine tool element, an adjustable stop engageable by a portion of the machine tool element at the limit of a selected movement of said element predetermined by the setting of said stop, a limit switch located on one of the last two mentioned relatively movable parts, and an abutment on the other of said parts for engagement with a movable operating arm extending from the switch.

30. In a mechanism of the class described, the combination with a machine tool element to be accurately positioned and automatically locked, of a screw and complemental nut for causing movement of said machine tool element, an electric motor for causing rotation between the screw and nut, an adjustable stop for engagement by said machine tool element for positioning the same, and means for automatically controlling the operation of said motor so as to break the circuit when the machine tool element is in a predetermined spaced relation to the stop, whereby to utilize overrun of the motor for the remaining movement of the machine tool element into abutment with the stop, and secure jamming between the screw and complemental nut to lock the machine tool element in position.

31. In an automatic positioning mechanism, the combination with a movable machine tool element, of an adjustable stop disposed for engagement by a portion of the machine tool element at the limit of a selected movement of said element predetermined by the setting of said stop, a coacting screw and nut for producing movement of said machine tool element, said screw and nut also adapted to lock said element in a given position, an electric motor for causing rotation between the screw and nut, and means dependent upon the setting of said stop for timing the breaking of the motor circuit, whereby to produce a locking action with the coacting nut and screw after engagement of the machine tool element with the stop by virtue of a predetermined overrun of the motor.

32. In an automatic positioning mechanism, the combination of a movable machine tool element, an adjustable stop disposed for engagement by a portion of the machine tool element at the limit of a selected movement of said element predetermined by the setting of said stop, a coacting screw and nut for causing movement of said machine tool element and also adapted for locking said element in engagement with the stop, and an electric motor for causing rotation between the screw and nut, said motor having its operation controlled so as to stop when the machine tool element is in engagement with the stop and the nut and screw are tightened a predetermined amount.

33. In an automatic mechanism of the character described, the combination of a movable part to be automatically positioned, means for communicating movement to said part, a coacting screw and nut disposed in parallel relation to the movement of said part, one of the last named coacting parts being adapted to serve as a stop to have abutment with the movable part at the limit of its movement predetermined by the adjustment of said parts, a motor serving as the source of power for the first mentioned means, means for causing rotation between the coacting nut and screw, and means for automatically stopping the motor by predetermined approach of the movable part to its limiting stop.

34. Automatic positioning mechanism comprising, in combination with a movable machine tool element, an adjustable positive stop for engagement by the machine tool element for accurately positioning the same, a propelling screw for said machine tool element, an electric motor for driving the screw, an electric circuit for said motor, and circuit breaker means for the motor inserted in said circuit including a circuit breaker element and means for operating said element dependent for their operation upon the operation of the propelling screw to break the electric circuit for the motor in a predetermined relation of the approach of the machine tool element to the stop, such breaking of the circuit allowing overrun of the motor which is utilized in tightening the screw when the machine tool element engages the stop so as to insure firm engagement between the latter parts and consequently accurate positioning of the machine tool element.

35. In a machine tool having a carriage movable on a support for positioning, a stop adjustable on the support and arranged to be engaged by the carriage, manually operable screw and nut means for adjusting the stop as desired, power operable screw and nut means for moving the carriage to the stop, a motor for causing relative rotation of the screw and nut with sufficient power for binding the screw and nut when the carriage engages the stop, whereby to insure accurate positioning, an electric circuit for the motor, and a switch for automatically opening the circuit in timed relation to the inter-engagement of the carriage and stop.

CHARLES B. DE VLIEG.